(12) United States Patent
Li

(10) Patent No.: US 10,398,261 B2
(45) Date of Patent: Sep. 3, 2019

(54) SPATULA

(71) Applicant: Byondy Inc., Taipei (TW)

(72) Inventor: Jung-Chau Li, Taipei (TW)

(73) Assignee: Byondy Inc., Taipei (TW)

( * ) Notice: Subject to any disclaimer, the term of this patent is extended or adjusted under 35 U.S.C. 154(b) by 101 days.

(21) Appl. No.: 15/801,785

(22) Filed: Nov. 2, 2017

(65) Prior Publication Data
US 2018/0177342 A1 Jun. 28, 2018

(30) Foreign Application Priority Data

Dec. 28, 2016 (TW) .............................. 105143725 A

(51) Int. Cl.
*A47J 43/28* (2006.01)
(52) U.S. Cl.
CPC .................................. *A47J 43/288* (2013.01)
(58) Field of Classification Search
CPC ....... A47J 43/288; A47J 43/283; A21B 3/003; A47G 21/045
USPC .................. 294/7, 173, 219, 8, 9, 26.5, 99.2
See application file for complete search history.

(56) References Cited

U.S. PATENT DOCUMENTS

| | | | | |
|---|---|---|---|---|
| 338,449 A * | 3/1886 | Teller | ..................... | A47J 43/283 294/7 |
| 1,906,281 A * | 5/1933 | Schroeder | .............. | A21B 3/003 294/49 |
| 2,174,334 A * | 9/1939 | Steinfels | ................ | A21B 3/003 294/56 |
| 2,485,521 A * | 10/1949 | Wendt | ................... | A47J 43/288 294/7 |
| 2,634,497 A * | 4/1953 | Waldesbuehl | ......... | A47G 21/04 15/236.08 |
| D191,526 S * | 10/1961 | Marcus | ......................... | D7/688 |
| 3,174,223 A * | 3/1965 | Gerson | ................ | A47G 21/045 294/7 |
| D204,296 S * | 4/1966 | Pine | ............................... | 30/324 |
| D262,428 S * | 12/1981 | Schildt | ........................... | D32/42 |
| 5,054,835 A * | 10/1991 | Loechel | ................. | A47G 21/10 294/3 |
| 5,291,992 A * | 3/1994 | Olivetti | .................. | A47G 21/14 206/223 |
| 5,294,467 A | 3/1994 | Hoodes | | |
| D426,748 S * | 6/2000 | Chau | ............................. | D7/395 |
| 6,193,289 B1* | 2/2001 | Brown | .................. | A47J 43/283 294/8 |
| 6,247,736 B1 | 6/2001 | Esterson et al. | | |
| 6,381,851 B1* | 5/2002 | Meyer | .................... | A21C 15/04 294/99.2 |

(Continued)

FOREIGN PATENT DOCUMENTS

| CN | 200945119 Y | 9/2007 |
|---|---|---|
| CN | 202078196 U | 12/2011 |

(Continued)

*Primary Examiner* — Gabriela M Puig

(57) ABSTRACT

A spatula, comprising: a blade portion, having a blade surface and a sidewall protruding from the blade surface; a shaft portion, connected to a sidewall of the blade portion along a first extension axis. Wherein an orthographic projection of the first extension axis does not pass through a center of the blade surface, and thus operation of the spatula is more ergonomic and can solve problems encountered when using a conventional spatula that is easier to result in shoulder discomfort and sore muscles.

14 Claims, 7 Drawing Sheets

(56) References Cited

U.S. PATENT DOCUMENTS

| | | | | |
|---|---|---|---|---|
| D458,090 S | * | 6/2002 | Veltri | D7/688 |
| 6,598,334 B1 | | 7/2003 | Edevold | |
| 7,399,016 B2 | * | 7/2008 | Barker | A47J 36/12 294/10 |
| D618,521 S | * | 6/2010 | Jalet | D7/688 |
| D648,602 S | * | 11/2011 | Gray | D7/688 |
| D689,345 S | * | 9/2013 | Genatossio | D7/688 |
| D718,006 S | * | 11/2014 | Sikora | D30/162 |
| 8,973,194 B1 | * | 3/2015 | Caughey | A47J 43/28 294/7 |
| D828,731 S | * | 9/2018 | Li | D7/688 |
| D830,139 S | * | 10/2018 | Li | D7/688 |
| D846,360 S | * | 4/2019 | Washington | D7/650 |
| 2001/0045753 A1 | * | 11/2001 | Lewis | A47J 43/283 294/3 |
| 2004/0164569 A1 | * | 8/2004 | Grundler | A47J 43/288 294/7 |
| 2006/0255605 A1 | * | 11/2006 | Yu | A47J 43/288 294/7 |
| 2008/0203747 A1 | * | 8/2008 | Stenglein | A47G 21/045 294/7 |
| 2012/0049549 A1 | * | 3/2012 | Hemmings | A47J 43/283 294/7 |
| 2015/0272362 A1 | * | 10/2015 | Lisek | A47J 43/288 294/7 |

FOREIGN PATENT DOCUMENTS

| | | | | |
|---|---|---|---|---|
| CN | 202698936 U | | 1/2013 | |
| CN | 103027601 A | | 4/2013 | |
| CN | 103054486 A | | 4/2013 | |
| CN | 103479255 A | | 1/2014 | |
| CN | 103844932 A | | 6/2014 | |
| CN | 103876659 A | | 6/2014 | |
| CN | 104643969 A | | 5/2015 | |
| DE | 3439615 A1 | * | 5/1986 | A47J 43/288 |
| DE | 9417644 U1 | * | 1/1995 | A47G 21/04 |
| EP | 1929910 A2 | | 6/2008 | |
| TW | M539896 U | | 4/2017 | |
| WO | WO-2018120552 A1 | * | 7/2018 | |

* cited by examiner

100a

SPATULA

FIELD OF THE INVENTION

The present invention relates to a type of kitchen utensils, especially a spatula.

BACKGROUND OF THE INVENTION

FIG. 1 is a schematic diagram of operation of a conventional spatula. As shown in FIG. 1, a conventional spatula 300 includes blade portion 310 and a shaft portion 320, wherein the shaft portion 320 is connected to the center of a side 311 of the blade portion 310. The shaft portion 320 has a grip 321. Based on the conventional structure, a user has to keep the forearm 52 and the upper arm 53 of an arm 50 bend for about 90 degrees and move the forearm 52 back and forth in order to stir the food.

However, nowadays most families have western system kitchenware. And as a height of a stove of western system kitchenware is higher, the user has to raise the elbow 51 of the arm 50 to almost the same height of the shoulder 60 when using the spatula 300. Thus, it easily leads to shoulder discomfort and sore muscles. Especially when using a deeper Chinese frying pan (wok), which has a higher sidewall, the user has to further raise the arm 50, and it may make shoulder discomfort and sore muscles worse.

SUMMARY OF THE INVENTION

The present invention provides a spatula in order to provide an ergonomic operation and can improve the problems encountered when using a conventional spatula in accordance with a western system kitchenware that is easier to result in shoulder discomfort and sore muscles.

In order to achieve at least one of the above or other advantages, an embodiment of the present invention provides a spatula, comprising: a blade portion, having a blade surface and a sidewall protruding from the blade surface; and a shaft portion, connected to sidewall of the blade portion along a first extension axis, wherein an orthographic projection of the first extension axis does not pass through a center of the blade surface.

In some embodiment of the present invention, the shaft portion is connected to a first corner of the blade surface.

In some embodiment of the present invention, the sidewall is protruded from two side edges of the blade surface, and the two side edges are adjacent to the first corner.

In some embodiment of the present invention, the blade surface has a second corner opposite to the first corner, and the second corner is a curved corner or a clipped corner.

In some embodiment of the present invention, the sidewall is not protruded from two side edges of the blade surface adjacent to the second corner.

In some embodiment of the present invention, an arc radius of the curved corner is in a range 5-300 mm.

In some embodiment of the present invention, an angle of two side edges, which are adjacent to the second corner, of the blade surface is more than or equal to 90 degrees.

In some embodiment of the present invention, one of two side edges of the blade surface adjacent to the second corner is straight or curved, and an arc radius of the curved side edge is more than 50 mm.

In some embodiment of the present invention, the blade portion further has a connecting portion, extended from the sidewall, and the shaft portion is connected to the connecting portion.

In some embodiment of the present invention, shaft body, the shaft body is separated into a first portion and a second portion connected to the first portion, the first portion is connected to the blade portion along the first extension axis, the second portion is extended along a second extension axis, and an orthographic projection of the second extension axis on the blade surface is in-between the center of the blade portion and the orthographic projection of the first extension axis on the blade surface.

In some embodiment of the present invention, an angle between the orthographic projection of the second extension axis on the blade surface and the orthographic projection of the first extension axis on the blade surface is an acute angle in a range of 5-45 degrees.

In some embodiment of the present invention, the first portion is inclined with respect to the blade surface to form a first obtuse angle between the first portion and the blade surface, the second portion is inclined with respect to the blade surface to form a second obtuse angle between the second portion and the blade surface, and the second obtuse angle is larger than the first obtuse angle.

In some embodiment of the present invention, the shaft portion further comprises a holder, applied on the second portion.

In some embodiment of the present invention, the blade portion further comprises a bottom surface opposite to the blade surface, and the bottom surface is a flat surface or a curved surface.

In some embodiment of the present invention, the sidewall is disposed on a side edge of the blade surface facing to the shaft portion.

In some embodiment of the present invention, the sidewall is disposed on the first extension axis.

In some embodiment of the present invention, the shaft portion includes a shaft body, the shaft body is separated into a first portion and a second portion connected to the first portion, the first portion is connected to the blade portion, the first portion is inclined with respect to the blade surface to form a first obtuse angle between the first portion and the blade surface, the second portion is inclined with respect to the blade surface to form a second obtuse angle between the second portion and the blade surface, and the second obtuse angle is larger than the first obtuse angle.

In some embodiment of the present invention, the shaft portion further comprises a holder, applied on the second portion.

The spatula of the embodiment of the present invention has the shaft portion connected to the blade surface along the first extension axis, and the orthographic projection of the first extension axis on the blade surface does not pass through the center of the blade surface, and thus operation of the spatula of the present invention is more ergonomic and the present invention can solve problems encountered when using a conventional spatula that is easier to result in shoulder discomfort and sore muscles.

The present invention will become more readily apparent to those ordinarily skilled in the art after reviewing the following detailed description and accompanying drawings.

DETAILED DESCRIPTION OF PREFERRED EMBODIMENTS

Figure 1:
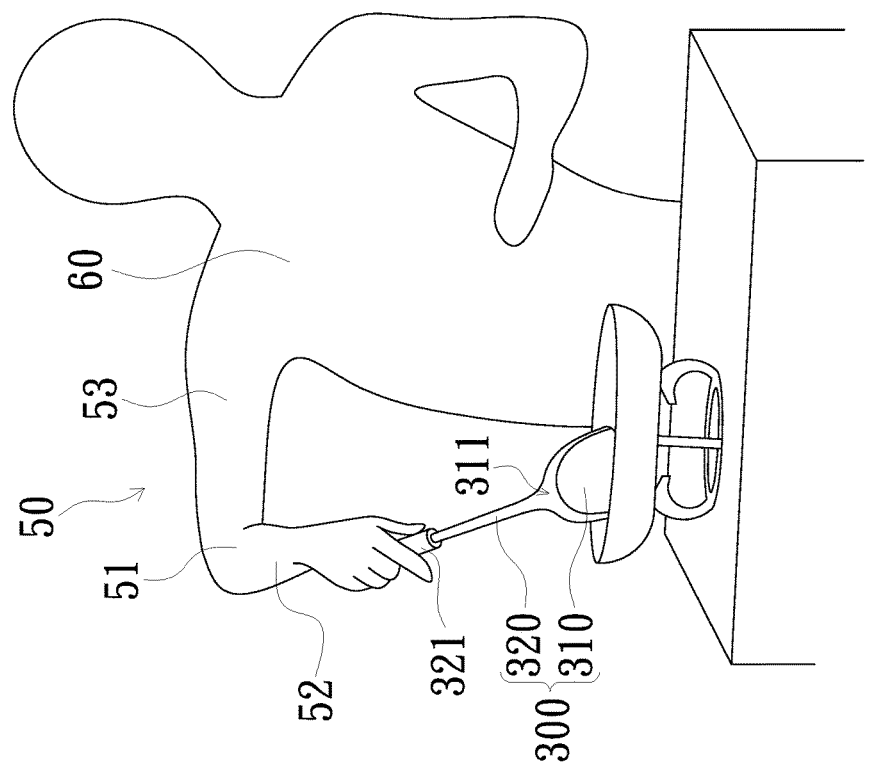
FIG. 1 is a schematic diagram of operation of a conventional spatula.
Figure 2:
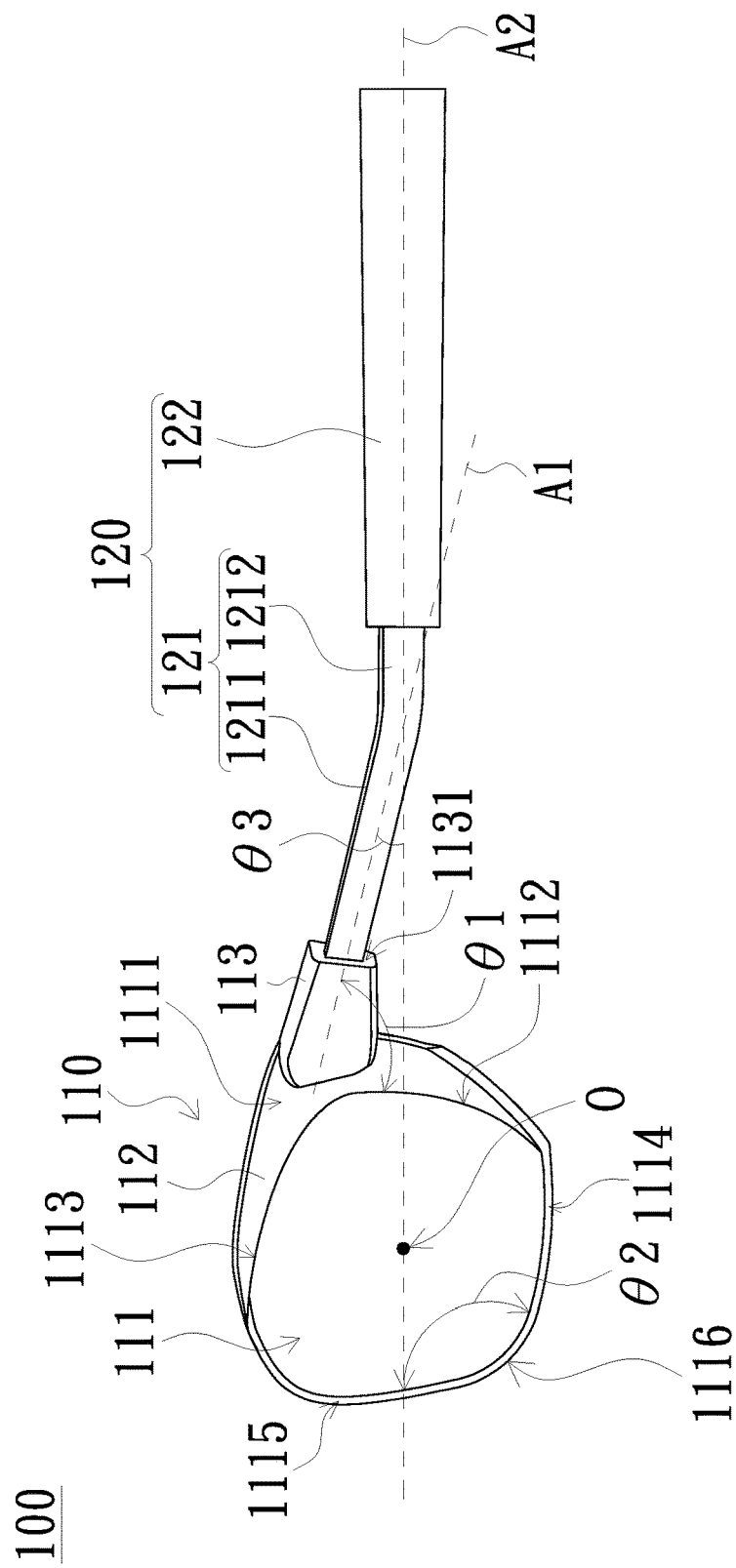
FIG. 2 is a schematic diagram of a spatula according to an embodiment of the present invention.

FIG. 2 is a schematic diagram of a spatula according to an embodiment of the present invention. As shown in FIG. 2, the spatula 100 comprises a blade portion 110 and a shaft portion 120. The blade portion 110 has a blade surface 111 and a sidewall 112 protruding out from the blade surface 111. The shaft portion is connected to the sidewall 112 of the blade portion 110 along a first extension axis A1. The orthographic projection of the first extension axis A1 on the blade surface 111 does not pass through the center of the blade surface 111. That is, the shaft portion 120 is not connected a central portion of a side edge 1112, which is close to the shaft portion 120, of the blade surface 111. For example, the shaft portion 120 of the present invention is connected to the junction of two adjacent side edge 1112 and 1113 of the blade surface 111 (i.e. a first corner 1111 of the blade surface 111), and an angle θ1 between the shaft portion 120 and the side edge 1112, for instance, can be an acute angle. However in other embodiments of the present invention, the angle θ1 can be a right angle or obtuse angle. A side edge 1114 of the blade surface 111 opposite to the side edge 1113 can be a front edge of the blade surface 111, as the front edge is usually the first part of the spatula 100 to contact with the food when using. Moreover, the blade surface 111 is a flat surface in this embodiment, but the present invention is not limited thereto. In another embodiment, the blade surface 111 is curve; and more particularly, the blade surface 111 can be concaved or in a shape of a spoon.

As the front edge is the side edge 1114 of the blade surface 111, the aforementioned sidewall 112 is, for example, at least disposed on the first extension axis A1. Specifically, sidewall 112 at least is disposed along the side edge 1113. In the present embodiment, the sidewall 112 protrudes from the two side edges 1112 and 1113, which are adjacent to the first corner 1111, of the blade surface 111. That is, the sidewall 112 is extended from the side edge 1113 to the side edge 1112. Therefore, a side edge 1115 of the blade surface 111 opposite to the side edge 1112 also can be the front edge of the blade surface 111. In another embodiment of the present invention, the sidewall 112 is extended from the side edge 1113 to the side edges 1115 and 1112. In addition, the blade portion 110 of this embodiment further comprises a connecting portion 113 extending from the sidewall 112, and the shaft portion 120 is connected to the connecting portion 113. More specifically, the connecting portion 113 includes, for example, a plug-in cavity 1131; and the shaft portion 120 is plugged into the plug-in cavity 1131 to connect the first corner 1111 through the connecting portion 113. In an embodiment, the connecting portion 113 and the shaft portion 120 is a one-piece structure.

The blade surface 111 of this embodiment further includes a second corner 1116 opposite to the first corner 1111, which is also the junction of the side edges 1114 and 1115. The sidewall 112 is not protruded from two side edges 1114 and 1115 of the blade surface 111 adjacent to the second corner 1116. The second corner 1116 is, for example, a curved corner. In an embodiment, the second corner 1116 has an arc radius in a range of 5 mm-300 mm; however, a specific shape of the second corner 1116 is not limited therein. For instance, the second corner 1116 can also be a clipped corner or a 90 degree corner. Moreover, an angle θ2 between the two side edges 1114 and 1115, which are adjacent to the second corner 1116, for example can be more than or equal to 90 degrees. In another embodiment, the angle θ2 can be less than 90 degrees. In addition, the two side edges 1114 and 1115, which are adjacent to the second corner 1116, singularly can be straight or curved/arc. An arc radius in the case of a curve side edge, for example, can be more than 50 mm, but the invention is not limited therein. As shown in FIG. 2, the two side edges 1114 and 1115 adjacent to the second corner 1116 are both arc side edges.

The abovementioned shape(s) of the blade surface 111 is for illustration only, the present invention is not limited therein. Additionally, the shaft portion 120 of the present embodiment, for instance, includes a shaft body 121. The shaft body 121, for instance, includes a first portion 1211, and a second portion 1212 connecting with the first portion 1211. Wherein the first portion 1211 is extended along the first extension axis A1 to connect to the sidewall 112 of the blade portion 110; and the second portion 1212 is extended along a second extension axis A2. An orthographic projection of the second extension axis A2 on the blade surface 111 is between the center O of the blade surface 111 and the orthographic projection of the first extension axis A1 on the blade surface 111. In other words, the orthographic projection of the second extension axis A2 on the blade surface 111 can pass through the center O of the blade surface 111 or be in-between the center O and the sidewall 112. The first portion 1211, for example, is connected to the junction of the two adjacent side edges 1112 and 1113 of the blade surface 111 (i.e. the first corner 1111 of the blade surface 111), hence there is a bend formed between the first portion 1211 and the second portion 1212. And thus an operating direction of the whole spatula 100 can be adjusted for easier holding and easier operation. An angle θ3 between the abovementioned orthographic projection of the second extension axis A2 on the blade surface 111 and the orthographic projection of the first extension axis A1 on the blade surface 111, for example, is an acute angle in a range of 5-45 degrees. A degree of the acute angle θ3 can be adjusted depending on different sizes of the blade portion. The present embodiment is preferably in a range of 15-18 degrees in order to put the barycenter of the spatula 100 in an optimum position. It is noted that depending on different shapes of the blade portion, the orthographic projection of the second extension axis A2 on the blade surface 111 can also be in-between the center O and the sidewall 112. In other embodiments, the shaft body 121 can be straight without bending, or the entire shaft body is curved.

The shaft portion 120 of the present embodiment further includes a holder 122. The holder 122 is applied to the second portion 1212 to provide functions of heat isolation and easier holding. The holder 122 is circularly surrounds the second portion 1212, wherein the holder 122 and the second portion 1212 can be a one-piece structure or two separately formed pieces. Moreover, the blade portion 110 and the shaft portion 120 can be assembled or a one-piece structure depending on different designs. Scilicet, the blade portion 110 and the shaft portion 120 can be two separately formed pieces being assembled thereafter. Or the blade portion 110 and the shaft portion 120 are an inseparable one-piece structure, the shaft portion 120 is extended out from the sidewall 112, and the blade portion 120 does not include the above connecting portion 113.

Figure 3:
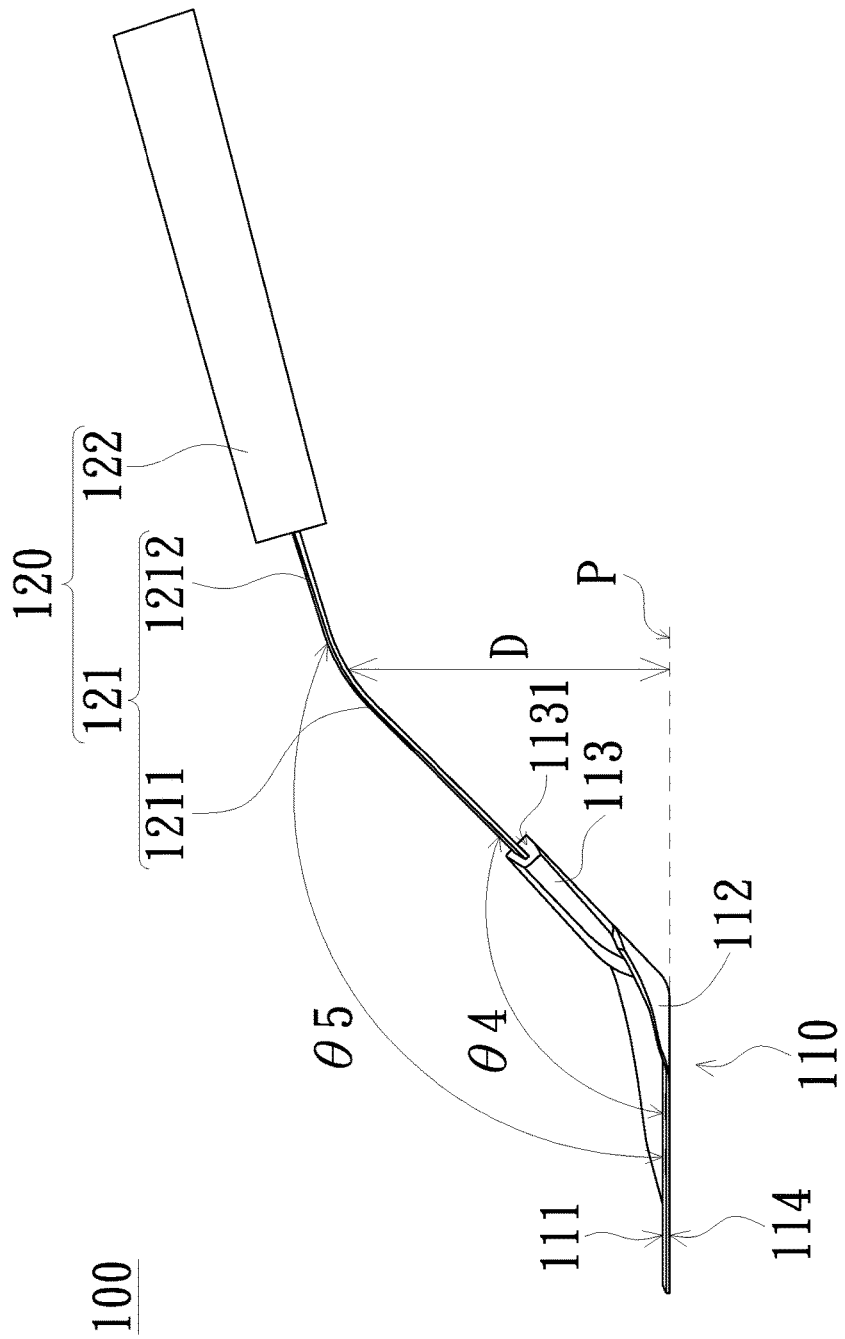
FIG. 3 is a schematic side view of a spatula according to another embodiment of the present invention.

FIG. 3 is a schematic side view of a spatula according to another embodiment of the present invention. As shown in FIG. 3, in this embodiment, the first portion 1211 of the shaft body 121, for instance, is inclined with respect to the blade surface 111 to form a first obtuse angle θ4 with the blade surface 111; and the second portion 1212 of the shaft body 121, for instance, is inclined with respect to the blade surface 111 to form a second obtuse angle θ5 with the blade surface 111. Wherein the first obtuse angle θ4 is smaller than the second angle θ5. In other words, the second portion 1212, for instance, is bended toward an extension surface P of the blade surface 111 with respect to the first portion 1211. A distance D between the bending portion (the junction/connecting portion of the first portion 1211 and the second 1212) and the extension surface P can be adjusted/designed depending on a depth of the frying pot. In FIG. 3, the first portion 1211 may be extended along the first extension axis A1 (as shown in FIG. 2) to connect to the sidewall 112 of the blade portion 110, and the second portion 1212 may be extended along the second extension axis A2 (as shown in FIG. 2). In another embodiment, the first portion 1211 and the second portion 1212 may both be extended in the first extension axis A1 (as shown in FIG. 2).

The shaft portion 120 is separated into the first portion 1211 and the second portion 1212 in the present embodiment; however in other embodiments, the entire shaft portion can be straight or curved without a bending portion, and has no separation of the first portion and the second portion. Moreover, the blade portion 110 can further include a bottom surface 114 opposite to the blade surface 111. In the present embodiment, the bottom surface 114, for example, is a flat surface, but a specific shape of the bottom surface 114 of the present invention is not limited herein. For instance, the bottom surface 114 can be a curved surface. In addition, in other embodiments, the blade portion 110 can further include one or more through holes (not shown in figures), penetrate from the blade surface 111 to the bottom surface 114 for a function of being a slotted spatula turner, wherein a shape of the through holes can be rounded circular or linear, it is not limited herein.

Figure 4:
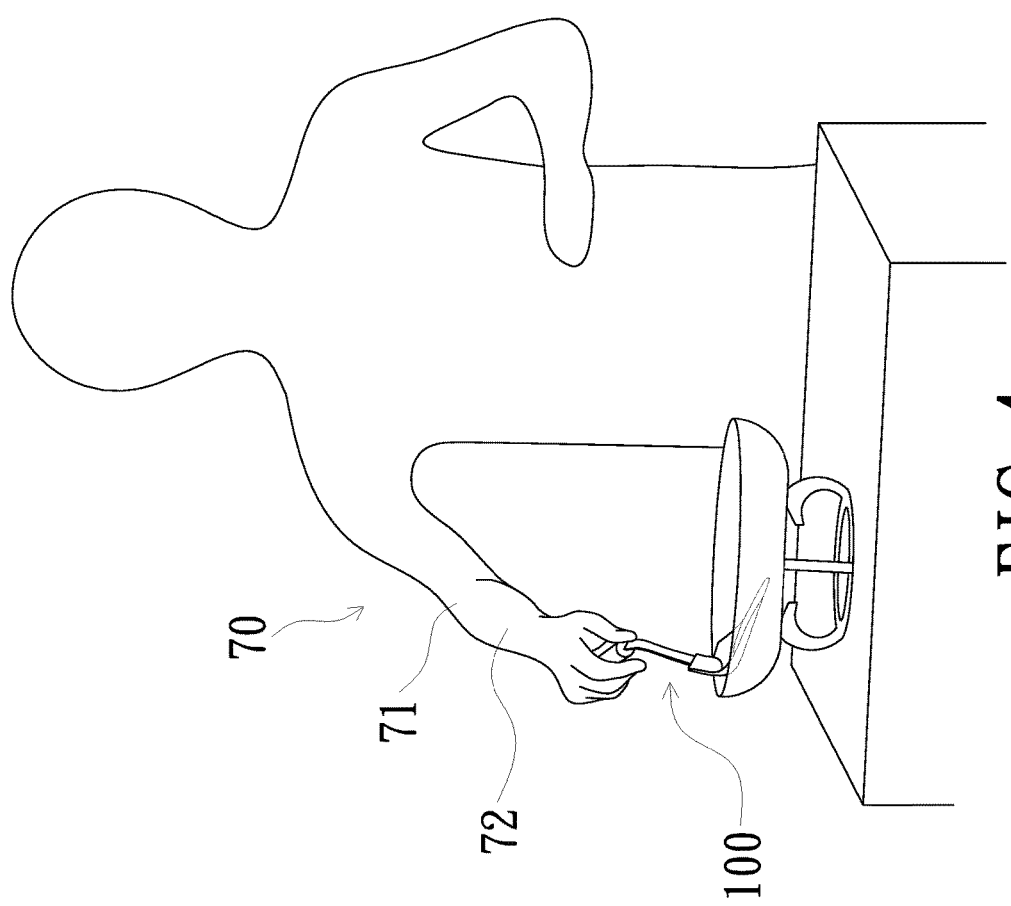
FIG. 4 is a schematic diagram of operation of the spatula as shown in FIG. 2.

FIG. 4 is a schematic diagram for operating the spatula as shown in FIG. 2. As shown in FIG. 2 and FIG. 4, the shaft portion 120 is extended along the first extension axis A1 to connect with the sidewall 112 of the blade portion 110, the orthographic projection of the first extension axis A1 does not pass through the center O of the blade surface 111 that the shaft portion 120 is connected to the first corner 1111 of the blade surface 111, and thus a height for a user raising an arm 70 can be reduced when using the spatula 100 of the present embodiment. The user only needs to use his/her elbow 71 as a center for swinging back and forth of the forearm 72 to fry the food. This operation is more ergonomic and can improve the problems encountered when using a Chinese frying pan (wok) with a western system kitchenware that is easier to result in shoulder discomfort and sore muscles as using a conventional spatula. Additionally, as shown in FIG. 3, because the second portion 1212 of the shaft portion 120 is bended toward an extension surface P of the blade surface 111 with respect to the first portion 1211, a height of the raised arm can be further reduced when using the spatula 100.

Figure 5:
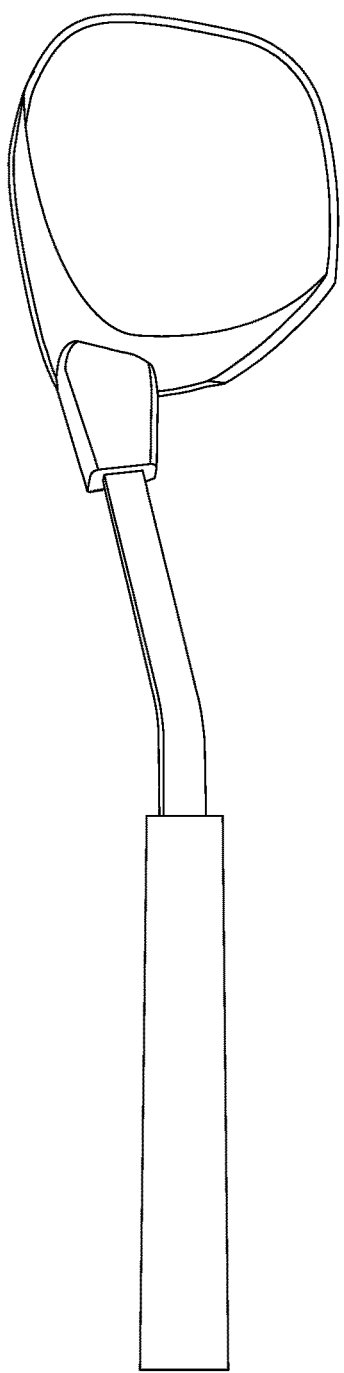
FIG. 5 is a schematic diagram of a spatula according to another embodiment of the present invention.

It is noted that the spatula 100 as shown in FIG. 2 is for right hand users. In other embodiments, a spatula can be designed for a left hand user by following the above illustrated principles/rules. As shown in FIG. 5, a spatula 100a has a mirror structure of the spatula 100 as shown in FIG. 2, and the spatula 100a is in accordance with the structure of the spatula 100 as shown in FIG. 2. The structure of the spatula 100a is suitable for left had users and also has the abovementioned functions and advantages.

Figure 6:
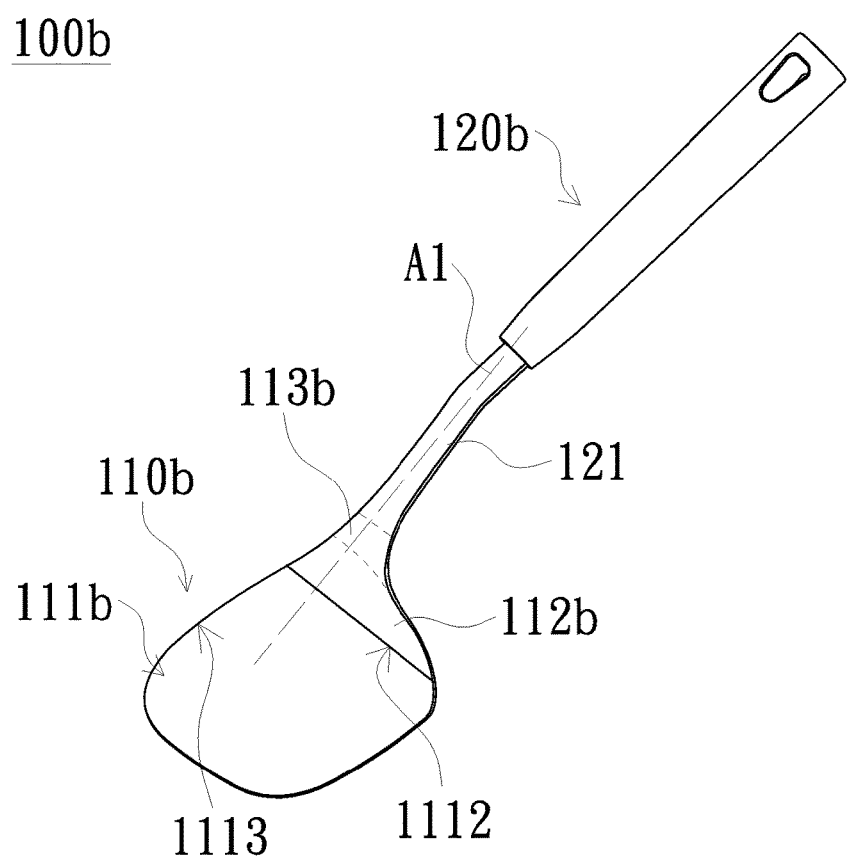
FIG. 6 is a schematic diagram of a spatula according to another embodiment of the present invention.

FIG. 6 is a schematic drawing of a spatula according to another embodiment of the present invention. As shown in FIG. 6, a spatula 100b of the present embodiment is similar to the spatula 100, and includes a blade portion 110b and a shaft portion 120b. The blade portion 110b has a blade surface 111b and a sidewall 112b protruding out from the blade surface 111b. The shaft portion 120b is connected to the sidewall 112b of the blade portion 110b along the first extension axis A1. The orthographic projection of the first extension axis A1 on the blade surface 111b does not pass through the center of the blade surface 111b. A major difference between the spatula 100b of the present embodiment and the spatula 100 as shown in FIG. 2 is that, the sidewall 112b is disposed on the side edge 1112 of the blade surface 111b facing to the shaft portion 120b, and that is, the sidewall 112b is disposed on the side edge 1112, where is adjacent to the blade surface 111b and the shaft portion 120b. The sidewall 112b is not disposed on the side edge 1113 of the blade surface 111b.

In addition, in the present embodiment, the connecting portion 113b, which is extended out from the sidewall 112b, and the shaft body 121 of the shaft portion 120b are a one-piece structure. In other embodiments, the connecting portion 113b shown in FIG. 6 can be modified into the connecting portion 113 shown in FIG. 2, which includes a plug-in cavity 1131, in order to assembly with the shaft body 121. And the connecting portion 113 shown in FIG. 2 can also be modified in to the connecting portion 113b shown in FIG. 6, which is a one-piece structure with the shaft body 121. Moreover, the shaft portion 120b can also be replaced into the shaft portion 120 shown in FIG. 2, which has the shaft body 121 including the first portion 1211 and the second portion 1212.

Figure 7:
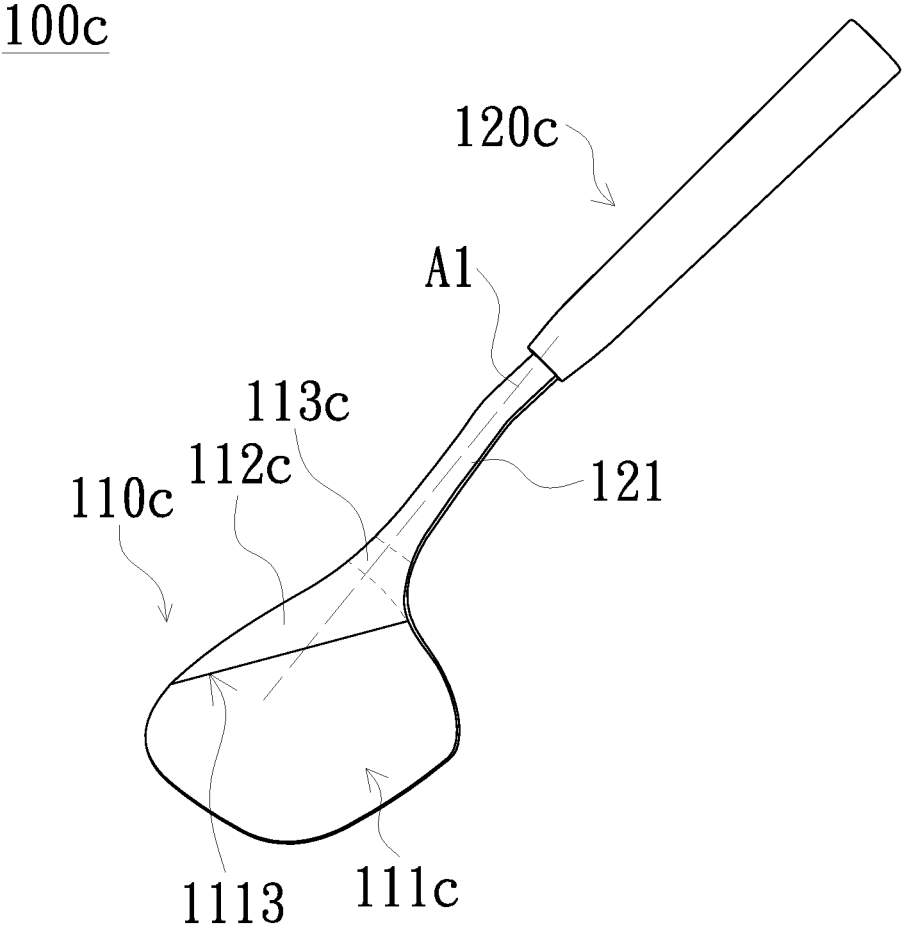
FIG. 7 is a schematic diagram of a spatula according to another embodiment of the present invention.

FIG. 7 is a schematic drawing of a spatula according to another embodiment of the present invention. As shown in FIG. 7, a spatula 100c of the present embodiment is similar to the spatula 100, and includes a blade portion 110c and a shaft portion 120c. The blade portion 110c has a blade surface 111c and a sidewall 112c protruding out from the blade surface 111c. The shaft portion 120c is connected to the sidewall 112c of the blade portion 110c along the first extension axis A1. The orthographic projection of the first extension axis A1 on the blade surface 111c does not pass through the center of the blade surface 111c. Major differences between the spatula 100c of the present embodiment and the spatula 100 as shown in FIG. 2 are that, the sidewall 112c is disposed on the side edge 1113 of the blade surface 111c, the first extension axis A1 passes through the sidewall 112c, and the sidewall 112c is not disposed on other sidewalls of the blade surface 111c.

In addition, in the present embodiment, the connecting portion 113c, which is extended out from the sidewall 112c, and the shaft body 121 of the shaft portion 120c are a one-piece structure. In other embodiments, the connecting portion 113c shown in FIG. 7 can be modified into the connecting portion 113 shown in FIG. 2, which includes a plug-in cavity 1131, in order to assembly with the shaft body 121. Moreover, the shaft portion 120c can also be replaced into the shaft portion 120 shown in FIG. 2, which has the shaft body 121 including the first portion 1211 and the second portion 1212.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A spatula, comprising:
a blade portion, having a blade surface and a sidewall protruding from the blade surface; and
a shaft portion, connected to sidewall of the blade portion along a first extension axis, wherein an orthographic projection of the first extension axis does not pass through a center of the blade surface,
wherein the shaft portion is connected to a first corner of the blade surface, the blade surface further has a second corner opposite to the first corner, the sidewall is not protruded from two side edges of the blade surface adjacent to the second corner, and the second corner is a curved corner or a clipped corner; wherein the sidewall is protruded from two side edges of the blade surface adjacent to the first corner.

2. The spatula according to claim 1, wherein an arc radius of the curved corner is in a range 5-300 mm.

3. The spatula according to claim 1, wherein an angle of two side edges of the blade surface adjacent to the second corner is more than or equal to 90 degrees.

4. The spatula according to claim 1, wherein one of two side edges of the blade surface adjacent to the second corner is straight or curved, and when the side edge is curved, an arc radius of the side edge is more than 50 mm.

5. The spatula according to claim 1, wherein the blade portion further has a connecting portion, extended from the sidewall, and the shaft portion is connected to the connecting portion.

6. The spatula according to claim 1, wherein the shaft portion comprises a shaft body, the shaft body is separated into a first portion and a second portion connected to the first portion, the first portion is connected to the blade portion along the first extension axis, the second portion is extended along a second extension axis, and an orthographic projection of the second extension axis on the blade surface is in-between a center of the blade portion and the orthographic projection of the first extension axis on the blade surface.

7. The spatula according to claim 6, wherein an angle between the orthographic projection of the second extension axis on the blade surface and the orthographic projection of the first extension axis on the blade surface is an acute angle in a range of 5-45 degrees.

8. The spatula according to claim 6, wherein the first portion is inclined with respect to the blade surface to form a first obtuse angle between the first portion and the blade surface, the second portion is inclined with respect to the blade surface to form a second obtuse angle between the second portion and the blade surface, and the second obtuse angle is larger than the first obtuse angle.

9. The spatula according to claim 6, wherein the shaft portion further comprises a holder, applied on the second portion.

10. The spatula according to claim 1, wherein the blade portion further comprises a bottom surface opposite to the blade surface, and the bottom surface is a flat surface or a curved surface.

11. The spatula according to claim 1, wherein the sidewall is disposed on a side edge of the blade surface facing to the shaft portion.

12. The spatula according to claim 1, wherein the sidewall is disposed on the first extension axis.

13. The spatula according to claim 1, wherein the shaft portion comprises a shaft body, the shaft body is separated into a first portion and a second portion connected to the first portion, the first portion is connected to the blade portion, the first portion is inclined with respect to the blade surface to form a first obtuse angle between the first portion and the blade surface, the second portion is inclined with respect to the blade surface to form a second obtuse angle between the second portion and the blade surface, and the second obtuse angle is larger than the first obtuse angle.

14. The spatula according to claim 13, wherein the shaft portion further comprises a holder, applied on the second portion.

* * * * *